United States Patent
Eger et al.

(10) Patent No.: US 9,361,655 B2
(45) Date of Patent: Jun. 7, 2016

(54) METHOD FOR COMPUTER-AIDED CONTROL OF THE ELECTRICAL POWER CONSUMPTION OF A PLURALITY OF POWER CONSUMERS IN AN ELECTRICAL POWER GRID

(75) Inventors: Kolja Eger, Ottobrunn (DE); Christoph Gerdes, Munich (DE); Gerd Voelksen, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 600 days.

(21) Appl. No.: 13/816,291
(22) PCT Filed: Jul. 8, 2011
(86) PCT No.: PCT/EP2011/061642
§ 371 (c)(1),
(2), (4) Date: Mar. 25, 2013
(87) PCT Pub. No.: WO2012/019837
PCT Pub. Date: Feb. 16, 2012

(65) Prior Publication Data
US 2013/0274939 A1 Oct. 17, 2013

(30) Foreign Application Priority Data
Aug. 9, 2010 (DE) .......... 10 2010 033 756

(51) Int. Cl.
*G06Q 50/06* (2012.01)
*H02J 13/00* (2006.01)
(Continued)

(52) U.S. Cl.
CPC .............. *G06Q 50/06* (2013.01); *G06Q 30/04* (2013.01); *H02J 3/14* (2013.01); *H02J 13/0055* (2013.01); *Y02B 70/3225* (2013.01); *Y04S 20/222* (2013.01); *Y04S 50/12* (2013.01)

(58) Field of Classification Search
None
See application file for complete search history.

(56) References Cited

U.S. PATENT DOCUMENTS 5,752,046 A  5/1998  Oprescu et al.
7,231,283 B2  6/2007  Maier
(Continued)

FOREIGN PATENT DOCUMENTS

AU  2004229818 A1  10/2004
CN  101449525 A  6/2009
(Continued)

OTHER PUBLICATIONS

Liao Sheng-Bin et al., "Utility-Based Energy Allocation Optimization in Wireless Sensor Networks", Journal of Electronics & Information Technology, vol. 30, No. 9, Sep. 2008, pp. 2271-2275— English abstract.
(Continued)

*Primary Examiner* — Sean Shechtman
*Assistant Examiner* — Steven Garland
(74) *Attorney, Agent, or Firm* — Laurence Greenberg; Werner Stemer; Ralph Locher

(57) ABSTRACT

In a method for controlling the electrical power consumption of a plurality of power consumers in a power grid, the power consumers represent network nodes of a communication network made of a plurality of network nodes, in which the power consumers communicate with each other. Each of the network nodes estimates the total power consumption of the network nodes based on the exchange of information with one other network node. Each network node having an additional power demand which increases a required amount of power, compares the total power consumption estimated by the network node plus the required amount of power to a predefined total power demand of the network nodes and initiates a delivery of the required amount of power from a power provider when the estimated total power demand thereof plus the required amount of power is less than the predefined total power demand by a threshold value.

22 Claims, 2 Drawing Sheets

(51) Int. Cl.
*G06Q 30/04* (2012.01)
*H02J 3/14* (2006.01)

(56) References Cited

U.S. PATENT DOCUMENTS

| | | |
|---|---|---|
| 7,743,086 B2 | 6/2010 | Hu et al. |
| 2006/0276938 A1 | 12/2006 | Miller |
| 2007/0055636 A1 | 3/2007 | Chambers et al. |
| 2008/0313188 A1 | 12/2008 | Hu et al. |
| 2009/0089595 A1 | 4/2009 | Brey et al. |
| 2009/0185542 A1 | 7/2009 | Zhang et al. |
| 2010/0023174 A1* | 1/2010 | Nagata et al. ................ 700/287 |
| 2013/0274939 A1* | 10/2013 | Eger et al. .................... 700/291 |

FOREIGN PATENT DOCUMENTS

| | | |
|---|---|---|
| DE | 102007055517 A1 | 3/2009 |
| RU | 2043687 C1 | 9/1995 |
| RU | 2249287 C2 | 3/2005 |

OTHER PUBLICATIONS

Wedde, H., et al., "Bottom-Up Self-Organization of Unpredictable Demand and Supply under Decentralized Power Management", Second IEEE International Conference on Self-Adaptive and Self-Organizing Systems, Oct. 2008, pp. 74-83.

* cited by examiner

METHOD FOR COMPUTER-AIDED CONTROL OF THE ELECTRICAL POWER CONSUMPTION OF A PLURALITY OF POWER CONSUMERS IN AN ELECTRICAL POWER GRID

BACKGROUND OF THE INVENTION

Field of the Invention

The invention relates to a method for computer-aided control of the electrical power consumption of a plurality of power consumers in an electrical power grid as well as a corresponding electrical power grid and a power consumer which can be used in the electrical power grid.

Within the framework of the distribution of electrical power provided by a power provider in an electrical power grid, peak loads which in certain circumstances might lead to the power provider no longer being unable to satisfy the power requirements of the power consumers in the network should be avoided. Approaches are therefore known from the prior art as to how the power supply of a power provider and the power consumption of power consumers can be coordinated. Usually central approaches are used in which information about the power consumption of the individual power consumers is gathered centrally and the load is then distributed appropriately on the basis of this information. These methods have the disadvantage that on the one hand a large amount of information has to be transferred to a central point, and on the other hand this information constitutes confidential data which enables a conclusion to be drawn about the user behavior of the users using the corresponding power consumers.

BRIEF SUMMARY OF THE INVENTION

The object of the invention is therefore to create a method for computer-aided control of the electrical power consumption of a plurality of power consumers in an electrical power grid which enables appropriate coordination of the power consumption of the consumers with the lowest data traffic possible.

This object is achieved by the method, the electrical power grid or the power consumer according to the claims. Developments of the invention are defined in the dependent claims.

The method according to the invention is for computer-aided control of the electrical power consumption of a plurality of power consumers in an electrical power grid, wherein the power consumers represent network nodes of a distributed communication network made up of a plurality of network nodes. In this communication network the power consumers can communicate with each other. The distributed communication network with the individual power consumers as network nodes can be realized using methods known per se, for example based on known peer-to-peer protocols.

In a step a) of the method according to the invention each of the network nodes estimates the total power consumption of the plurality of network nodes on the basis of the exchange of information with at least one other network node. According to a step b) each network node, the power demand of which increases by a required amount of power, compares the total power consumption estimated by it plus the required amount of power to a predefined total power demand of the plurality of network nodes and initiates a procurement of the required amount of power from a power provider if its estimated total power consumption plus the required amount of power is less than the predefined total power demand by at least a predetermined threshold value. The features of the method described in the aforementioned by step a) and b) do not here constitute a fixed chronological order in which the corresponding features are executed.

The method according to the invention enables, in a simple manner, an adjustment of the procurement of power from individual power consumers by means of a distributed exchange of information between the power consumers, without information about the power demand of the individual consumers having to be gathered at a central point. The method is therefore characterized on the one hand by data minimization and on the other hand by the protection of confidential information concerning the power demand of the individual energy consumers. According to the invention a purely distributed approach is created for controlling the power demand on the part of the consumers, in order to adjust the total power consumption to a predefined total power demand by this means. The total power demand is, for example, provided by a load profile, which specifies the chronological sequence of the total power to be provided in the electrical power grid. The load profile thus describes the maximum capacity for power which a power provider can provide or would like to provide at corresponding times. By selecting an appropriate predetermined threshold value, e.g. as a percentage value of the predefined total power demand, it can be ensured that the total power consumption is always below the predefined total power demand. If necessary the predetermined threshold value can also be set to zero so that a procurement of power is always initiated if the total power consumption estimated by a network node plus the required amount of power is smaller than or equal to the predefined total power demand.

In a preferred embodiment of the method according to the invention, in the event that its estimated total power consumption plus the required amount of power is less than the predefined total power demand by at least a predetermined threshold value, each network node repeats step b) after a predetermined interval of time. In this way it is ensured that the network node can receive the additional power it requires at a later time. The length of the predetermined interval of time is extended in a further embodiment of the method according to the invention after each repetition of step b), for example doubled. As a result, even load distribution is achieved on the network nodes if a large number of network nodes require power from the power provider.

In a further embodiment of the method according to the invention, after a predetermined number of repetitions of step b) the respective network node no longer takes part in the method. In other words, the respective network node leaves the distributed network and can then procure its power in another way from that power provider or another power provider, for example at increased prices. In this way it is ensured that a power consumer does not have to wait too long for a required amount of power.

In a further embodiment of the method according to the invention, at predetermined intervals of time each network node selects at least one network node from the set of network nodes known to it in order to estimate the total power consumption of the plurality of network nodes on the basis of the exchange of information with the at least one selected network node. Preferably the at least one network node will be selected at random. This ensures that the estimate of the total power consumption in each network node is as up-to-date as possible.

In a preferred embodiment of the method according to the invention, the exchange of information in step a) takes place between each of a predefined number of network nodes, wherein this predefined number is a particularly preferred variant comprising a pair of network nodes. Preferably each network node of the predefined number transmits the average power consumption estimated by it of an individual network node in the communication network, or a variable from which the average power consumption can be deduced, to the other network nodes of the predefined number. The average power consumption represents average power consumption for each network node in the network. Each network node of the predefined number updates its estimated average power consumption taking into consideration all average power consumptions of the network nodes of the predefined number and determines an updated, estimated total power consumption of the plurality of network nodes from this. The updated average power consumption for each network node of the predefined number is preferably the arithmetic mean of the average power consumption of all network nodes of the predefined number.

In a further variant of the method according to the invention, each network node of the predefined number transmits a total number estimated by it of network nodes in the communication network, or a variable from which the estimated total number can be deduced, to the other network nodes of the predefined number, wherein each network node of the predefined number updates its estimated total number taking into consideration all the total numbers of network nodes of the predefined number and then updates the estimated total power consumption of the plurality of network nodes on the basis of a multiplication of the average power consumption estimated and updated by it by the updated total number. In this way the method can be used appropriately in distributed networks, in which the individual network nodes do not know how large the total number of network nodes in the network is.

In a preferred variant of the aforementioned exemplary embodiment each network node of the predefined number transmits its estimated total number of network nodes or the reciprocal value of its estimated total number of network nodes to the other network nodes of the predefined number, wherein the updated total number of network nodes for each network node of the predefined number is obtained by dividing the reciprocal value of the total of the reciprocal values of the estimated total numbers of all network nodes of the predefined number by the predefined number. In this way an appropriate averaging of the total number is obtained between the network nodes of the predefined number.

In a further embodiment of the method according to the invention, if it reduces its power consumption from the power provider by an amount of power each network node reduces its estimated average power consumption by this amount of power. In this way it is also ensured that reductions in demand are taken into account appropriately when estimating the average power consumption. Analogously each network node preferably increases its estimated average power consumption by the required amount of power even if it initiates a procurement of a required amount of power from the power provider.

The method according to the invention can be used in any kind of electrical power grid. In particular the power consumers representing the individual, corresponding network nodes are in each case a power consumption unit and/or a group of power consumption units, for example the power consumption units of a household. The method according to the invention is appropriate in particular for the distribution of electrical power among power consumption units which are configured such that the procurement of an amount of power required by the power consumption unit can be deferred without significantly compromising the function of the power consumption unit. This is the case, for example, for air conditioning installations or consumption units for the procurement of electrical power for electric vehicles.

Analogous to the power consumers, the power provider in the method according to the invention can also be configured in any way. There may be one or more power generators and/or one or more power distributors.

In addition to the aforementioned method, the invention further comprises an electrical power grid with a plurality of power consumers, wherein the power consumers represent network nodes of a distributed communication network made up of a plurality of network nodes, in which network the power consumers can communicate with each other. The network nodes in the electrical power grid are configured such that the aforementioned method or one or more variants of this method according to the invention can be executed in the electrical power grid.

Furthermore, the invention relates to a power consumer which is configured such that it can operate as a network node in the aforementioned distributed communication network and can therefore execute the corresponding steps of the method according to the invention or one or more variants of said method.

Exemplary embodiments of the invention are described in detail below on the basis of the attached figures.

BRIEF DESCRIPTION OF THE SEVERAL VIEWS OF THE DRAWING

These are.

DESCRIPTION OF THE INVENTION

Figure 1:
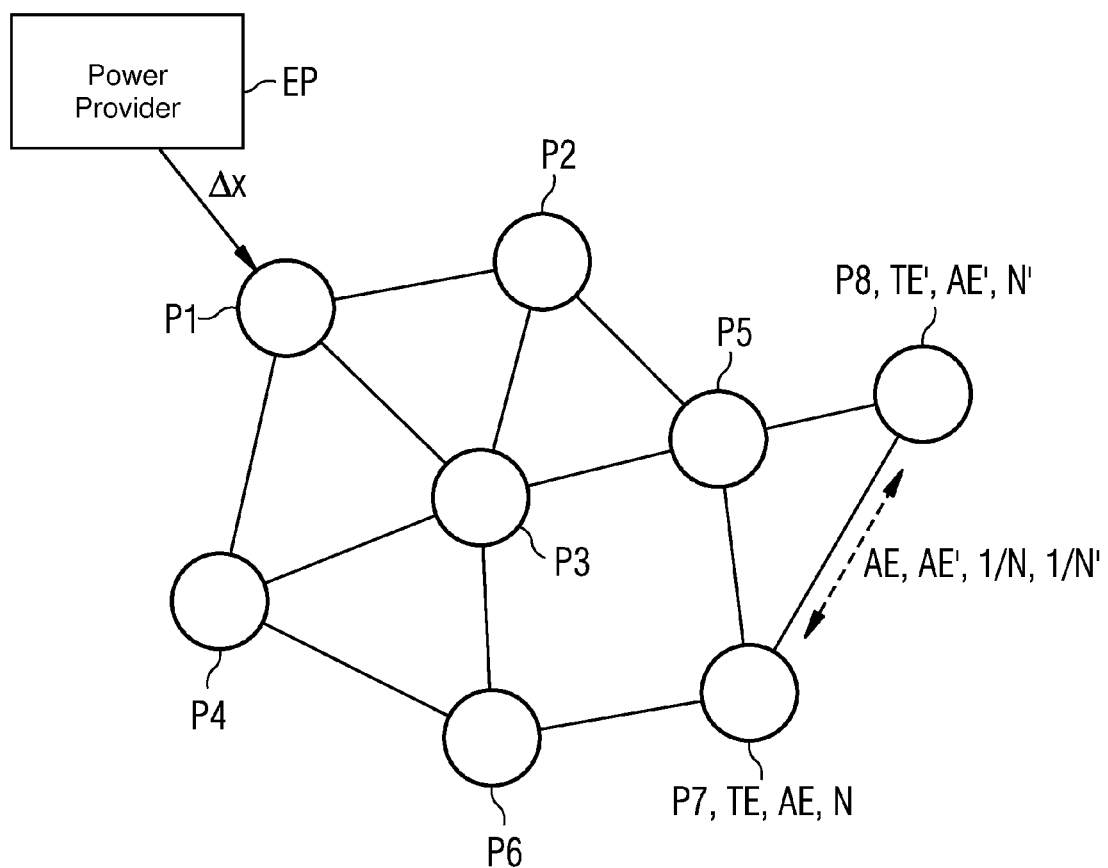
FIG. 1 a schematic representation of an electrical power grid in which a variant of the method according to the invention is executed.

FIG. 1 shows a schematic representation of an electrical power grid, for example in the form of a so-called smart grid, in which the power consumption of a plurality of power consumers is controlled by an embodiment of the method according to the invention. To achieve the control according to the invention the power consumers are networked with each other via a distributed communication network and in this sense represent network nodes or peers of the communication network. FIG. 1 shows an electrical power grid with a total of eight consumers P1, P2, . . . , P8, which are corresponding nodes in the communication network, wherein the communication links of the network existing between the individual network nodes are indicated by means of continuous lines between the peers. The communication network is here a meshed network, wherein each peer in the network knows a certain number of other peers. However, each peer does not know the total number of the eight peers in the communication network. The distributed network shown in FIG. 1 can be formed between the peers using methods known per se, for example on the basis of the known chord ring or other peer-to-peer protocols. The electrical power grid shown is only for clarification of the method according to the invention. In real-life applications the network consists of considerably more than eight peers (e.g. 1000 or more peers).

In a preferred variant the individual peers represent individual intelligent power consumers with corresponding software or hardware at their disposal in order to be able to communicate with other peers in the network on the basis of the method according to the invention. These are preferably power consumers in which a procurement of electrical power within a certain time frame can also be deferred without greatly comprising the function of the power consumer. Examples of such power consumers are air conditioning installations or control units for the procurement of electric power for electric vehicles. The corresponding control units can be integrated into the electric vehicle itself as intelligent power consumers or also integrated into the corresponding charging point for charging the electric vehicle. If need be, there is also the option of the individual peers forming a combination of several power consumption devices, e.g. a peer may relate to all or some of the power consumption devices in a private household or in a company.

In the electrical power grid of FIG. 1 all the peers procure their electrical energy from a power provider EP, wherein by way of example the procurement of an amount of power increased by the value Δx by the peer P1 is indicated by a solid arrow. Various configurations of the power provider EP are possible in this case. In particular it may be a power plant operator or the operator of a virtual power plant that jointly manages a plurality of energy suppliers. Likewise, the power provider EP can be realized by a so-called aggregator which aggregates the electrical power provided by several power suppliers or power generators and assumes the coordination of power provision to the electrical power grid.

In implementing the method for the distribution of energy in the electrical power grid of FIG. 1 there is no central body which gathers the energy amounts required by the individual peers and on the basis thereof controls the distribution of energy to the peers. On the contrary, the individual peers control their procurement of power among each other. A peer which may obtain an amount of power required by it within the framework of the method retrieves this amount of power from the power provider EP. The power provider does not know what the current power consumption in the individual power consumers is and furthermore the power provider does not have the opportunity to gather and evaluate status information concerning the power consumption of the individual peers. In particular, no information about the power consumption or the behavior of the users of the individual power consumers is transmitted to the power provider within the framework of the method.

The method according to the invention explained below is based on methods which are known within the framework of the distribution of information in computer networks under the term "gossiping", where pairs of peers exchange information with each other at intervals of time. In the variant described here each of the peers P1 to P8 randomly selects another peer from the distributed network with which it exchanges corresponding information after a predefined interval of time $T_G$. The exchange of information is indicated by way of example in FIG. 1 for the pair consisting of peers P7 and P8. As explained in more detail below, each individual peer estimates for itself the current total power consumption of all the peers in the network on the basis of an estimated average power consumption and an estimated total number of all peers in the network. This total number is not known to the individual peers as not every peer knows all the peers in the network. In FIG. 1 the total power consumption estimated by the peer P7 is indicated by the reference character TE, its estimated average power consumption by the reference character AE and its estimated total number of peers by the reference character N. Analogously the total power consumption estimated by the peer P8 is indicated by the reference character TE', its estimated average power consumption by the reference character AE' and its estimated total number of peers by the reference character N'.

Within the framework of communication between the two peers P7 and P8, the estimated total power consumption of both peers is updated, wherein the peer P7 transmits the average consumption AE estimated by it to the node P8, which in turn transmits the average consumption AE' correspondingly estimated by it to the peer P7. Furthermore, the peer P7 transmits the reciprocal value of its estimated total number 1/N to peer P8, which analogously transmits the reciprocal value 1/N' estimated by it to the peer P7. On the basis of the information received in the peers, the estimated total power consumption TE or TE' is then updated, as explained in detail below.

In the description below an exchange of information between a peer Pi and a peer Pj from the set of peers in the communication network is explained in general. The estimated value of a peer Pi for the total consumption, which is indicated by TE or TE' in FIG. 1, is now indicated by $\hat{y}_i$. In addition, the total number of peers estimated by the corresponding peer Pi, which is indicated by N or N' in FIG. 1, is now indicated by $\hat{N}_i$. Furthermore, for the average power consumption of a peer Pi, which is indicated by AE or AE' in FIG. 1, the variable $\hat{y}_i^{ave}$ is now used.

Within the framework of the initialization of the method initially some peers which would like to procure power from the power provider EP are registered with the power provider, wherein the peers set up a distributed data network among themselves using a corresponding protocol at the same time. Within the framework of the chronological sequence of registration each peer receives a corresponding index i, wherein each of the peers Pi initializes itself with the following values for the average consumption or the reciprocal value of the total number of peers at a time t of the initialization:

$$\hat{y}_i^{ave}(t) = 0,$$

$$\frac{1}{\hat{N}_i(t)} = \begin{cases} 1 & \text{if Pi first peer (i.e. Pi = P1)} \\ 0 & \text{otherwise} \end{cases}$$

Within the framework of the gossiping process the individual estimated values in each peer Pi are updated at predetermined intervals of time $T_G$. For updating the corresponding peer Pi selects another peer known to it of the communication network which is denoted below by Pj, where the peer Pi sends the values $\hat{y}_i^{ave}$ and $$\frac{1}{\hat{N}_i}$$

estimated by it to the other peer Pj. After receipt of these values the peer Pj transmits its values $\hat{y}_j^{ave}$ and $$\frac{1}{\hat{N}_j}$$

estimated by it to the peer Pi. After receipt of these values, the peer Pi sends back a confirmation with which it acknowledges that the receipt of the values was successful. The average power consumption $\hat{y}_i^{ave}$ and the total number of peers $\hat{N}_i$ at the time t+1 is then updated in the peer Pi. Updating of the average power consumption is based on an averaging of the average power consumptions estimated in the peers Pi and Pj and is as follows:

$$\hat{y}_i^{ave}(t+1) = \frac{1}{2}(\hat{y}_i^{ave} + \hat{y}_j^{ave}).$$

The total number of peers at the time t+1 is updated via a corresponding averaging of the reciprocal values of the total numbers estimated in the peers Pi and Pj and is as follows:

$$\frac{1}{\hat{N}_i}(t+1) = \frac{\frac{1}{\hat{N}_i} + \frac{1}{\hat{N}_j}}{2}.$$

On the basis of a multiplication of the updated estimated total number by the updated estimated average consumption, a new estimated value of the total power consumption in the network is then obtained for the peer Pi as follows:

$$\hat{y}_i(t+1) = \hat{y}_i^{ave}(t+1) \cdot \hat{N}_i(t+1).$$

After the peer Pj has received the aforementioned confirmation from the peer Pi, it updates its variables in the same way as the peer Pi, i.e. the following new values are obtained for the updated variables:

$$\hat{y}_j^{ave}(t+1) = \frac{1}{2}(\hat{y}_i^{ave} + \hat{y}_j^{ave}),$$

$$\frac{1}{\hat{N}_j}(t+1) = \frac{\frac{1}{\hat{N}_i} + \frac{1}{\hat{N}_j}}{2} \text{ and}$$

$$\hat{y}_j(t+1) = \hat{y}_j^{ave}(t+1) \cdot \hat{N}_j(t+1).$$

In order now to take into account the aforementioned estimated value for the total power consumption in an appropriate manner during the procurement of power from the power provider EP, a predefined power demand is provided in each of the individual peers in the form of a load profile which reflects a predefined total power demand of the peers in the communication network for a predetermined period, for example for a day or a longer or shorter period of time. The load profile can e.g. be based on a temporary prediction of the power demand of the peers in the network. If necessary, the load profile can also be selected on the basis of an appropriate guideline, in accordance with which a power provider would like to provide the network of peers with electrical power. The load profile is denoted by $Y^{target}$ below.

A peer in the network, which in addition to its current power consumption would like to procure an additional amount of power $\Delta x$ from the power provider EP, first compares the total power consumption currently estimated by it plus the additional amount of power to the current power demand in accordance with the load profile. If the total comprising the estimated total power consumption and additional amount of power $\Delta x$ is smaller than or equal to the power demand in accordance with the load profile, the peer initiates the procurement of the additional amount of power $\Delta x$ from the power provider by increasing its load accordingly. Furthermore, the corresponding peer updates its estimated average power consumption to a new value which is obtained from the current average power consumption plus the additional amount of power. Mathematically, therefore, the procurement of an additional amount of power $\Delta x$ can be described as follows for a peer Pi:

If $(\hat{y}_i + \Delta x \leq Y^{target}) \Rightarrow$ $$x_i(t+1) = x_i(t) + \Delta x$$

$$\hat{y}_i^{ave}(t+1) = \hat{y}_i^{ave}(t) + \Delta x$$

$x_i(t)$ here denotes the current amount of power which the peer Pi obtains from the power provider. This value is updated to $x_i(t+1)$. In the event that the above condition is not met, i.e. if the total of the estimated total power demand plus the additional amount of power is greater than the load profile, after a predetermined interval of time $T_R$ another attempt is made to procure the additional amount of power. In a special variant the intervals of time $T_R$ are extended after each unsuccessful procurement of power, for example doubled. Peak loads in which a large number of peers require more power from the power provider EP at the same time may be taken into account in an appropriate manner.

In order to also take into account a reduction in the power consumption $x_i(t)$ in the aforementioned method, in the case of such a reduction the procurement of power from the power provider is reduced accordingly and in addition the estimated value of the average consumption is reduced. This can be described in mathematical terms by the following equations:

$$x_i(t+1) = x_i(t) - \Delta x,$$

$$\hat{y}_i^{ave}(t+1) = \hat{y}_i^{ave}(t) - \Delta x.$$

As is clear from the above explanations, with the method according to the invention a distributed procurement of electrical power from a power provider is obtained without the latter having to gather power consumption data from the individual peers. Instead only aggregated information is exchanged. Therefore it is not possible for the power provider to draw conclusions about user behavior with regard to the power consumption. An additional advantage of the method is data minimization.

The method is in particular suitable for distributed management of a large number of power consumers, for example, in the order of several thousand consumers. Not all the functions in the electrical power grid need to be realized in a distributed manner. Certain functions, such as e.g. the conclusion of contracts and billing, can also be processed on central servers. In contrast, the aforementioned distributed approach is used for the compute-intensive and bandwidth-intensive task of status monitoring of the procurement of power by the individual peers.

Figure 2:
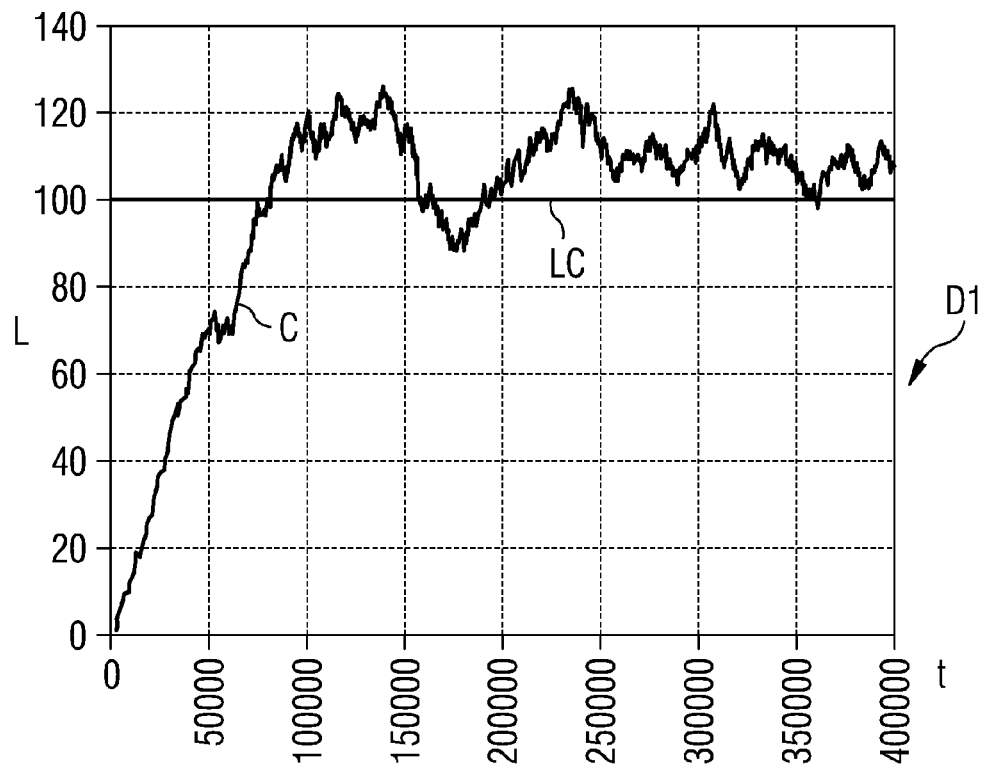
FIG. 2 two diagrams which compare the power consumption controlled by the method according to the invention with a power consumption without control according to the invention.
Figure 2:
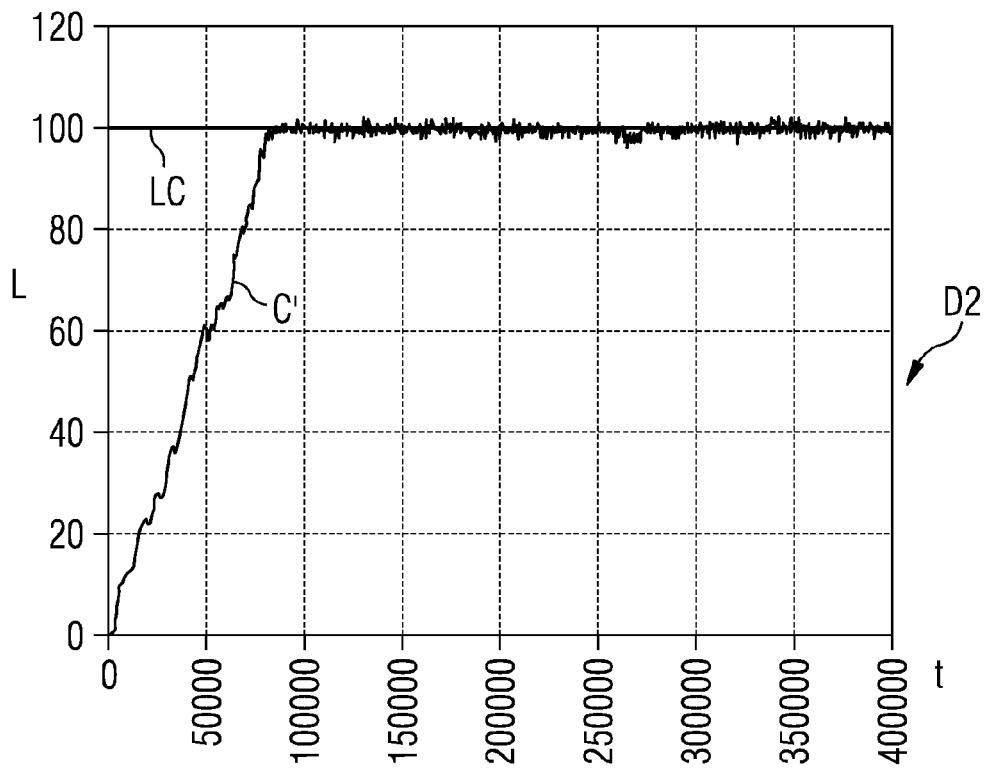

The inventors tested the method on the basis of simulations, as shown in the diagrams D1 and D2 of FIG. 2. For a plurality of time increments, which are shown along the abscissa t of the two diagrams D1 and D2, predetermined additional amounts of power were procured randomly from the power provider by the individual peers or the power demand was decreased accordingly, wherein the resulting total load L is shown in the diagram D1 by the curve C and in the diagram D2 by the curve C'. In addition, in the diagrams a predefined load curve LC is marked, which was taken into account by the method according to the invention within the framework of the simulation. In the diagram D1 the load was controlled without using the method according to the invention, whereas in the diagram D2 the method according to the invention was used. It is clear that in the diagram D2 after an initialization phase the total load matches the predefined load curve LC very well. In contrast, in the diagram D1 there are deviations above and below the load curve LC. If necessary, in order to ensure that in the diagram D2 the load curve LC is not exceeded at any time, in a variant of the method according to the invention a load procurement can also be controlled such that the procurement of an additional amount of power is only permitted if the estimated total power consumption plus the additional amount of power is less than the load profile by a predetermined positive threshold value.

The invention claimed is:

1. A method for computer-aided control of electrical power consumption of a plurality of power consumers in an electrical power grid, the power consumers representing network nodes of a distributed communication network made up of a plurality of network nodes, in which the power consumers communicating with each other, which method comprises the steps of:
   a) estimating, via each of the network nodes, a total power consumption of the plurality of network nodes on a basis of an exchange of information with at least one other of the network nodes; and
   b) each of the plurality of network nodes having an additional power demand which increases a required amount of power by a network node, comparing the total power consumption estimated by the network node plus the required amount of power to a predefined total power demand of the plurality of network modes and initiates a procurement of the required amount of power from a power provider when the network node estimate of the total power consumption plus the required amount of power is less than the predefined total power demand by at least a predetermined threshold value.

2. The method according to claim 1, wherein in an event that in step b) the total power consumption estimated by each of the network nodes plus the required amount of power is not less than the predefined total power demand by at least the predetermined threshold value, each of the network nodes repeats step b) after a predetermined interval of time.

3. The method according to claim 2, which further comprises extending a length of the predetermined interval of time after each repetition of step b).

4. The method according to claim 2, wherein after a predetermined number of repetitions of step b) each of the network nodes no longer takes part in the method.

5. The method according to claim 2, which further comprises doubling a length of the predetermined interval of time after each repetition of step b).

6. The method according to claim 1, wherein the predefined total power demand is provided by a load profile which specifies a chronological sequence of a total power to be provided in the electrical power grid.

7. The method according to claim 1, wherein at predetermined intervals of time each of the network nodes selects at least one network node from the plurality of network nodes known to the network node, to estimate the total power consumption of the plurality of network nodes on the basis of the exchange of information with at least one selected network node.

8. The method according to claim 1, which further comprises performing the exchange of information taking place in step a) between a predefined number of the network nodes.

9. The method according to claim 8, wherein each of the network nodes of the predefined number of the network nodes transmits an average power consumption estimated by the network node of an individual network node in the communication network or a variable from which the average power consumption can be deduced, to the other network nodes of the predefined number of the network nodes, wherein each of the network nodes of the predefined number of the network nodes updates its estimated average power consumption taking into account all the average power consumptions of the network nodes of the predefined number of the network nodes and ascertains an updated estimated total power consumption of the plurality of network nodes therefrom.

10. The method according to claim 9, wherein the updated average power consumption for each of the network nodes of the predefined number of the network nodes is an arithmetic mean of the average power consumptions of all the network nodes of the predefined number of the network nodes.

11. The method according to claim 9, wherein each of the network nodes of the predefined number of the network nodes transmits a total number estimated by it of the network nodes in the communication network or a variable from which the total number can be deduced, to the other network nodes of the predefined number of the network nodes, wherein each of the network nodes of the predefined number of the network nodes updates its total number taking into account all total numbers of the network nodes of the predefined number of the network nodes and then on a basis of a multiplication of the average power consumption estimated and updated by it by an updated total number updates the estimated total power consumption of the plurality of network nodes.

12. The method according to claim 11, wherein each of the network nodes of the predefined number of the network nodes transmits its estimated total number of the network nodes or a reciprocal value of the estimated total number of the network nodes to the other network nodes of the predefined number of the network nodes, wherein the updated total number of the network nodes for each network node of the predefined number of the network nodes is produced from the reciprocal value of the total of the reciprocal values of the estimated total numbers of all the network nodes of the predefined number of the network nodes divided by the predefined number of the network nodes.

13. The method according to claim 9, wherein when a respective one of the network nodes reduces its power consumption with the power provider by an amount of power, the respective network node reduces its estimated average power consumption by the amount of power.

14. The method according to claim 9, wherein a respective network node initiates a procurement of the required amount of power from the power provider, the respective network node increases its estimated average power consumption by the required amount of power.

15. The method according to claim 1, wherein the predetermined threshold value is zero or corresponds to a percentage value of the predefined total power demand.

16. The method according to claim 1, wherein the method is used in the electrical power grid, in which the power consumers each contain at least one of a power consumption unit or a group of power consumption units.

17. The method according to claim 16, wherein at least some of the power consumption units are in each case air conditioning installations and/or consumption units for a procurement of electrical power for electric vehicles.

18. The method according to claim 1, which further comprises performing the method in the electrical power grid in which the power provider contains at least one of power generators or power distributors.

19. The method according to claim 1, which further comprises performing the exchange of information taking place in step a) between a pair of the network nodes.

20. An electrical power grid, comprising:
   a plurality of power consumers representing network nodes of a distributed communication network made up of a plurality of said network nodes, said power consumers communicating with each other and said network nodes in the electrical power grid are configured such that:

a) said network nodes each on a basis of an exchange of information with at least one other of said network nodes estimates a total power consumption of said plurality of network nodes;
b) each of said network nodes having an additional power demand which increases a required amount of power of a network node, comparing the total power consumption estimated by said network node plus the required amount of power to a predefined total power demand of said plurality of network nodes and initiates a procurement of the required amount of power from a power provider when the total power consumption estimated of said network node plus the required amount of power is less than the predefined total power demand by at least a predetermined threshold value.

21. The electrical power grid according to claim 20, wherein in an event that in step b) the total power consumption estimated by each of said network nodes plus the required amount of power is not less than the predefined total power demand by at least the predetermined threshold value, each of said network nodes repeats step b) after a predetermined interval of time.

22. A power consumer for use in an electrical power grid, the power consumer representing a network node of a distributed communication network made up of a plurality of network nodes representing power consumers, in which the power consumers communicating with each other, wherein during operation in the electrical power grid the power consumer is configured such that:
a) said power consumer estimates a total power consumption of said plurality of network nodes on a basis of an exchange of information with at least one other network node;
b) when a power demand of said power consumer increases by a required amount of power, said power consumer compares the total power consumption estimated by the power consumer plus the required amount of power to a predefined total power demand of the plurality of network nodes and initiates a procurement of the required amount of power from a power provider when the total power consumption estimated by the power consumer plus the required amount of power is less than the predefined total power demand by at least a predetermined threshold value.

\* \* \* \* \*